United States Patent
Mochizuki et al.

(10) Patent No.: US 12,007,294 B2
(45) Date of Patent: *Jun. 11, 2024

(54) OPERATION PROCESSING APPARATUS, ANGLE SENSOR AND POWER STEERING APPARATUS

(71) Applicant: TDK Corporation, Tokyo (JP)

(72) Inventors: Shinichirou Mochizuki, Tokyo (JP); Hiraku Hirabayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 716 days.

This patent is subject to a terminal disclaimer.

(21) Appl. No.: 17/152,063

(22) Filed: Jan. 19, 2021

(65) Prior Publication Data

US 2021/0140837 A1    May 13, 2021

Related U.S. Application Data

(63) Continuation of application No. 16/162,586, filed on Oct. 17, 2018, now Pat. No. 10,948,368.

(30) Foreign Application Priority Data

Nov. 27, 2017 (JP) ................................. 2017-226834

(51) Int. Cl.
*G01L 3/10* (2006.01)
*B62D 15/02* (2006.01)
(Continued)

(52) U.S. Cl.
CPC ............ *G01L 3/10* (2013.01); *B62D 15/0235* (2013.01); *G01D 5/14* (2013.01); *B62D 5/0403* (2013.01); *G01B 7/30* (2013.01)

(58) Field of Classification Search
None
See application file for complete search history.

(56) References Cited

U.S. PATENT DOCUMENTS 6,496,266 B1   12/2002   Nishioki
6,639,207 B2   10/2003   Yamamoto et al.
(Continued)

FOREIGN PATENT DOCUMENTS

DE   10 2004 001 570 B4   10/2015
JP      2000-258188 A       9/2000
(Continued)

OTHER PUBLICATIONS

Nishioki Nobuhisa; Absolute Displacement Measuring Apparatus; JP2000258188A; Publication Date Sep. 22, 2000; Mitutoyo Corp; (Year: 2000).*

(Continued)

*Primary Examiner* — Nasima Monsur
(74) *Attorney, Agent, or Firm* — Posz Law Group, PLC (57) ABSTRACT

An operation processing apparatus that calculates a rotation angle based on a first output signal and a second output signal, which differ in signal frequency from each other, is provided with a first cross-coupled operation part that performs a first cross-coupled operation and a second cross-coupled operation part that performs a second cross-coupled operation based on the first and second output signals. A first Lissajous curve generation part generates a first Lissajous curve based on the result of operation by the first cross-coupled operation part, and a second Lissajous curve generation part generates a second Lissajous curve based on the result of operation by the second cross-coupled operation part. A rotation angle computing part calculates the rotation angle based on the first Lissajous curve and the second Lissajous curve.

2 Claims, 8 Drawing Sheets

(51) Int. Cl.
    *G01B 7/30*     (2006.01)
    *G01D 5/14*     (2006.01)
    *B62D 5/04*     (2006.01)

(56) References Cited

U.S. PATENT DOCUMENTS

| | | |
|---|---|---|
| 7,060,969 B2 | 6/2006 | Uchiyama et al. |
| 7,377,046 B2 | 5/2008 | Yamada |
| 9,250,103 B2 | 2/2016 | Takada et al. |
| 2011/0087456 A1* | 4/2011 | Satou .............. B62D 5/049 |
| | | 324/207.25 |
| 2016/0161289 A1 | 6/2016 | Fujita |
| 2017/0187518 A1* | 6/2017 | Fujita .............. H04L 27/14 |
| 2017/0254670 A1 | 9/2017 | Lin et al. |

FOREIGN PATENT DOCUMENTS

| | | |
|---|---|---|
| JP | 2001-183169 A | 7/2001 |
| JP | 2005-326309 A | 11/2005 |
| JP | 2011-106935 A | 6/2011 |

OTHER PUBLICATIONS

Lissajous-Figur, Wikipedia, Dec. 11, 2019, https://de.wikipedia.org/w/index.php?title=Lissajous-Figur&oldid=16 . . . .

English translation of Office Action dated Dec. 2, 2020 issued in corresponding CN patent application No. 201811410290.1.

\* cited by examiner

OPERATION PROCESSING APPARATUS, ANGLE SENSOR AND POWER STEERING APPARATUS

CROSS-REFERENCE TO RELATED APPLICATIONS

The present application is a continuation application of U.S. utility application Ser. No. 16/162,586 filed on Oct. 17, 2018, which is based on Japanese Patent Application No. 2017-226834 filed on Nov. 27, 2017, the contents of which are incorporated herein by reference.

TECHNICAL FIELD

The present invention relates to an operation processing apparatus that computes a rotation angle based on output signals from sensor elements, an angle sensor, and a power steering apparatus.

BACKGROUND ART

Vehicle power steering apparatuses detect the rotation angle of a steering wheel with an angle detection apparatus and drive a motor or a hydraulic system according to the detected rotation angle to assist in the steering force of the steering wheel, whereby the driver can steer with a small steering force.

As such an angle detection apparatus, those that have multiple magnets that are different from one another in the number of poles, multiple magnetic sensor elements that output sensor signals according to the magnetic fluxes of the magnets, and an operation processing apparatus that computes the rotation angle based on the sensor signals that are output from the magnetic sensor elements are known.

PRIOR ART DOCUMENT

Patent Document

[Patent Document 1] Japanese Unexamined Patent Application Publication No. 2001-183169.

SUMMARY OF THE INVENTION

Problem to be Solved by the Invention

Patent Document 1 discloses a position detection apparatus. The position detection apparatus calculates a rotation angle (an electric angle EA1) based on a sensor signal that is output from one magnetic sensor element and calculates a rotation angle (an electric angle EA2) based on a sensor signal that is output from the other magnetic sensor element. Using a phenomenon that the phases of the rotation angles (the electric angles EA1 and EA2) gradually shift with the rotation of the rotative body, the rotation angle (a mechanical angle MA) is computed from the difference between the two electric angles (EA1−EA2).

The sensor signals that are output from the sensor elements include a sine signal (a sin signal) and a cosine signal (a cos signal) showing the rotation angle θ of the rotative body. The rotation angles (the electric angles EA1 and EA2) are calculated by an arctangent operation (an atan operation) using the sine signal and the cosine signal. In other words, it is necessary to compute an arctangent (atan) from the sensor signal (a sin signal and a cos signal) that is output from one magnetic sensor element and also similarly compute an arctangent (atan) from the sensor signal (a sin signal and a cos signal) that is output from the other magnetic sensor element. Therefore, a problem is that the operation processing circuit that is necessary for the arctangent operation processing has a large circuit scale, and the power consumption of the angle detection apparatus including the operation processing circuit is increased. Moreover, another problem is that the arctangent (atan) operation requires a high clock count, which increases the operation processing time of the operation processing circuit.

With the view of the above problem, the present invention aims to provide an operation processing apparatus that is capable of performing operation processing to obtain a rotation angle of a rotative body that rotates in a short time and reduce the power consumption of the operation processing circuit that performs the operation processing. The present invention further provides angle sensor that is provided with the operation processing apparatus and a steering apparatus that is provided with the angle sensor.

Problem Solution Means

In order to solve the above problem, the present invention provides an operation processing apparatus that calculates a rotation angle based on a first output signal that is output from a first magnetic sensor element and a second output signal that is output from a second magnetic sensor element. The first output signal has a different signal frequency from the second output signal. The first output signal includes two kinds of signals that are different in phase from each other. The second output signal includes two kinds of signals that are different in phase from each other. The operation processing apparatus includes a first cross-coupled operation part that performs a first cross-coupled operation based on one signal that is included in the first output signal and one signal that is included in the second output signal, a second cross-coupled operation part that performs a second cross-coupled operation based on the other signal that is included in the first output signal and the other signal that is included in the second output signal, a first Lissajous curve generation part that generates a first Lissajous curve based on the result of operation by the first cross-coupled operation part, a second Lissajous curve generation part that generates a second Lissajous curve based on the result of operation by the second cross-coupled operation part, and a rotation angle computing part that calculates the rotation angle based on the first Lissajous curve and the second Lissajous curve.

In the above operation processing apparatus, it is preferable that the first output signal includes a first sine signal and a first cosine signal, the second output signal includes a second sine signal that is different in frequency from the first sine signal and a second cosine signal that is different in frequency from the first cosine signal, the first cross-coupled operation part performs addition/subtraction as the first cross-coupled operation using a 1-1st signal set that includes the first sine signal and the second cosine signal and a 1-2nd signal set that includes the second sine signal and the first cosine signal, and the second cross-coupled operation part performs addition as the second cross-coupled operation using a 2-1st signal set that includes the first sine signal and the second sine signal and a 2-2nd signal set that includes the first cosine signal and the second cosine signal.

In this specification, a "sine signal" includes, in addition to signals that have an ideal sine waveform, signals that have a waveform that is highly close to the ideal sine waveform (a distortion factor of 30% or lower) (almost sine signals). Moreover, in this specification, a "cosine signal" includes, in addition to signals that have an ideal cosine waveform, signals that have a waveform that is highly close to the ideal cosine waveform (a distortion factor of 30% or lower) (almost cosine signals). In this regard, the distortion factor is measured using a distortion factor measuring apparatus or the like that can separate and evaluate ideal components and distorted components of a signal by the Fourier analysis or other methods. Moreover, the sine signal and the cosine signal simply mean that their phases are shifted from each other, and there is no restriction on their phase difference. However, preferably, their phase difference falls within a range of 90 degrees±20 degrees.

In the above operation processing apparatus, it is preferable that the first cross-coupled operation part performs addition using the 1-1st signal set and subtraction using the 1-2nd signal set as the first cross-coupled operation.

In the above operation processing apparatus, it is preferable that the first Lissajous curve and the second Lissajous curve are shifted from each other substantially by a π/2 cycle.

In this specification, "being shifted substantially by a π/2 cycle" means that the shift of the cycles of two curves, the first Lissajous curve and the second Lissajous curve, falls within a range of π/2±0.35 (rad).

Moreover, the present invention provides an angle sensor that includes a first magnetic field generation part and a second magnetic field generation part that integrally rotate with a rotative body, a magnetic sensor part that has the first magnetic sensor element and the second magnetic sensor element, and the above operation processing apparatus, where the first magnetic field generation part and the second magnetic field generation part are magnets that differ from one another in the number of poles. The first magnetic sensor element outputs the first output signal according to the magnetic field generated from the first magnetic field generation part, and the second magnetic sensor element outputs the second output signal according to the magnetic field generated from the second magnetic field generation part.

In the above angle sensor, it is preferable that the first magnetic sensor element and the second magnetic sensor element are each a TMR element, a GMR element, an AMR element, or a Hall element.

Furthermore, the present invention provides a steering apparatus that includes a motive power generation part that gives a motive power to a steering mechanism of a steering to assist in the steering force of the steering, the above angle sensor, which detects the rotation angle of the steering, and a control part that drives the motive power generation part according to the rotation angle that is detected by the angle sensor.

Effect of the Invention

The present invention can provide an operation processing apparatus that is capable of performing operation processing to obtain a rotation angle of a rotative body that rotates in a short time and reducing the power consumption of the operation processing circuit that performs the operation processing, an angle sensor that includes the operation processing apparatus, and a steering apparatus that includes the angle sensor.

MODE FOR IMPLEMENTING THE INVENTION

Figure 1:
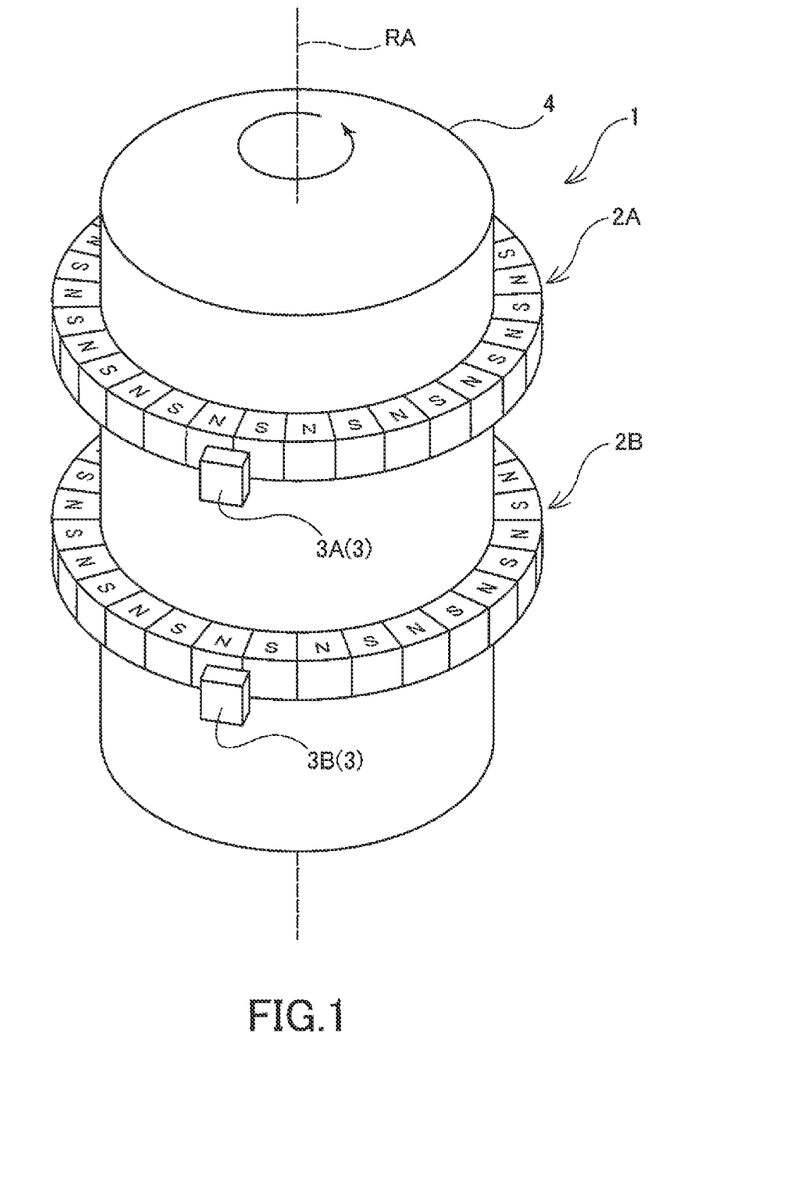
FIG. 1 is a perspective view that shows a schematic configuration of the rotation angle detection apparatus according to one embodiment of the present invention.
Figure 2:
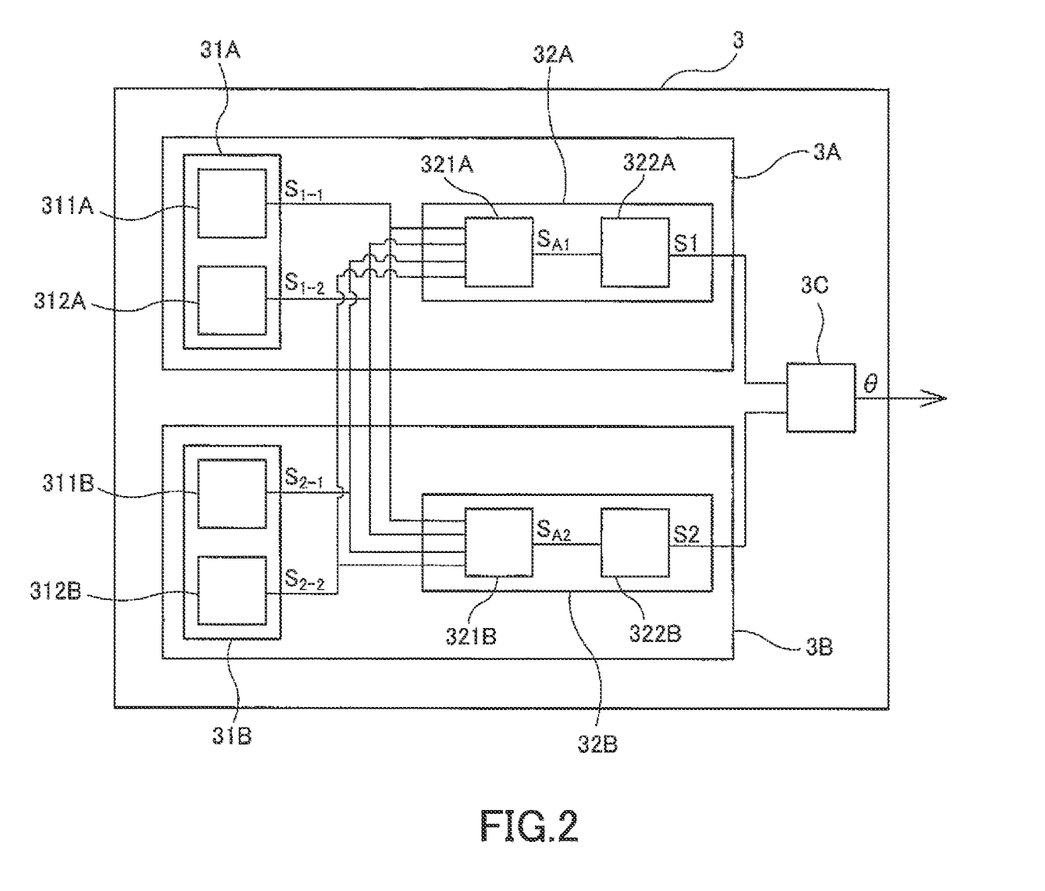
FIG. 2 is a block diagram that shows a schematic configuration of the magnetic detection apparatus in the one embodiment of the present invention.
Figure 7:
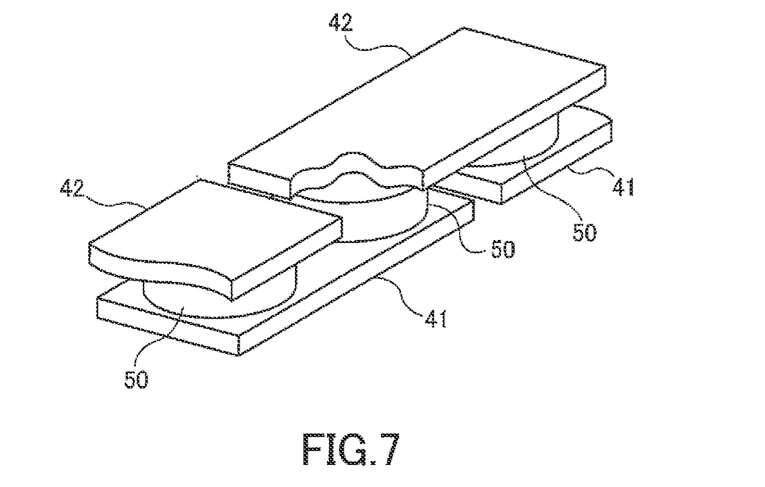
FIG. 7 is a perspective view that shows a schematic configuration of an MR element as the magnetic detection element in the one embodiment of the present invention.
Figure 8:
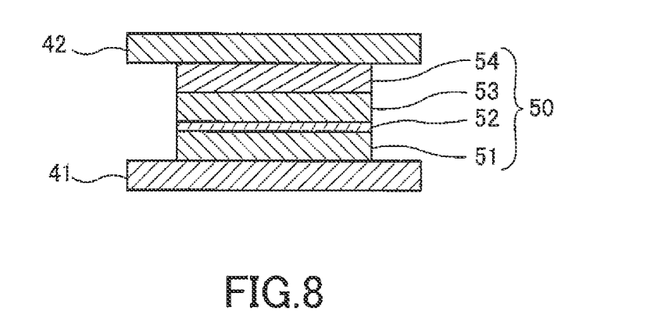
FIG. 8 is a cross-sectional view that shows a schematic configuration of an MR element as the magnetic detection element in the one embodiment of the present invention.

An embodiment of the present invention will be described in detail with reference to the drawings. FIG. 1 is a perspective view that shows a schematic configuration of the rotation angle detection apparatus according to this embodiment. FIG. 2 is a block diagram that shows a schematic configuration of the magnetic detection apparatus in this embodiment. FIGS. 3 to 6 are circuit diagrams that schematically show the circuit configurations of the 1-1st Wheatstone bridge circuit, the 1-2nd Wheatstone bridge circuit, the 2-1st Wheatstone bridge circuit, and the 2-2nd Wheatstone bridge circuit in this embodiment. FIGS. 7 and 8 are a perspective view and a cross-sectional view that show a schematic configuration of an MR element as the magnetic detection element in this embodiment.

A rotation angle detection apparatus 1 according to this embodiment includes a first multipolar magnet 2A and a second multipolar magnet 2B that have a different number of poles from each other, and a magnetic detection apparatus 3 that includes a first magnetic detection apparatus 3A and a second magnetic detection apparatus 3B that are arranged to face the first multipolar magnet 2A and the second multipolar magnet 2B, respectively.

The first multipolar magnet 2A and the second multipolar magnet 2B are provided on a shaft 4 with a space in-between and are rotatable about a rotation axis RA. They rotate about the rotation axis RA to be interlocked with the rotation of the shaft 4.

The first multipolar magnet 2A and the second multipolar magnet 2B include a plurality of pairs of an N pole and an S pole, and the N poles and the S poles are alternately arranged in a radial fashion (a ring shape). The first multipolar magnet 2A and the second multipolar magnet 2B each generate a magnetic field based on their own magnetization. In this embodiment, the first multipolar magnet 2A and the second multipolar magnet 2B have different numbers of poles from each other. In the mode shown in FIG. 1, the first multipolar magnet 2A has 15 poles and the second multipolar magnet 2B has 14 poles. However, the numbers of poles of the first multipolar magnet 2A and the second multipolar magnet 2B are not limited to these numbers. Moreover, the difference in the number of poles between the first multipolar magnet 2A and the second multipolar magnet 2B is not particularly restricted.

The first magnetic detection apparatus 3A is arranged to face the first multipolar magnet 2A and detects the magnetic field that is generated by the first multipolar magnet 2A. The second magnetic detection apparatus 3B is arranged to face the second multipolar magnet 2B and detects the magnetic field that is generated by the second multipolar magnet 2B. The rotation angle detection apparatus 1 according to this embodiment can detect the rotation angle θ of the shaft 4 that rotates based on output from each of the first magnetic detection apparatus 3A and the second magnetic detection apparatus 3B.

The magnetic detection apparatus 3 has the first magnetic detection apparatus 3A, the second magnetic detection apparatus 3B, and an operation processing part 3C. The first magnetic detection apparatus 3A has a first magnetic sensor part 31A, which outputs sensor signals based on change in the magnetic field that accompanies the rotation of the first multipolar magnet 2A, and a first operation part 32A. The second magnetic detection apparatus 3B has a second magnetic sensor part 31B, which outputs sensor signals based on change in the magnetic field that accompanies the rotation of the second multipolar magnet 2B, and a second operation part 32B. The first operation part 32A has a first cross-coupled operation part 321A, which performs a first cross-coupled operation based on sensor signals that are output from the first magnetic sensor part 31A and the second magnetic sensor part 31B, and a first Lissajous curve generation part 322A. The second operation part 32B has a second cross-coupled operation part 321B, which performs a second cross-coupled operation based on sensor signals that are output from the first magnetic sensor part 31A and the second magnetic sensor part 31B, and a second Lissajous curve generation part 322B.

The first magnetic sensor part 31A and the second magnetic sensor part 31B each include at least one magnetic detection element and may include a pair of series-connected magnetic detection elements. In such a case, the first magnetic sensor part 31A has a 1-1st Wheatstone bridge circuit 311A and a 1-2nd Wheatstone bridge circuit 312A that include a first pair of series-connected magnetic detection elements and a second pair of series-connected magnetic detection elements. The second magnetic sensor part 31B has a 2-1st Wheatstone bridge circuit 311B and a 2-2nd Wheatstone bridge circuit 312B that include a first pair of series-connected magnetic detection elements and a second pair of series-connected magnetic detection elements. Here, the first magnetic sensor part 31A and the second magnetic sensor part 31B may have a half-bridge circuit that includes only a first air of magnetic detection elements and does not include a second magnetic detection element in place of each of the 1-1st Wheatstone bridge circuit 311A, the 1-2nd Wheatstone bridge circuit 312A, the 2-1st Wheatstone bridge circuit 311B, and the 2-2nd Wheatstone bridge circuit 312B.

Figure 3:
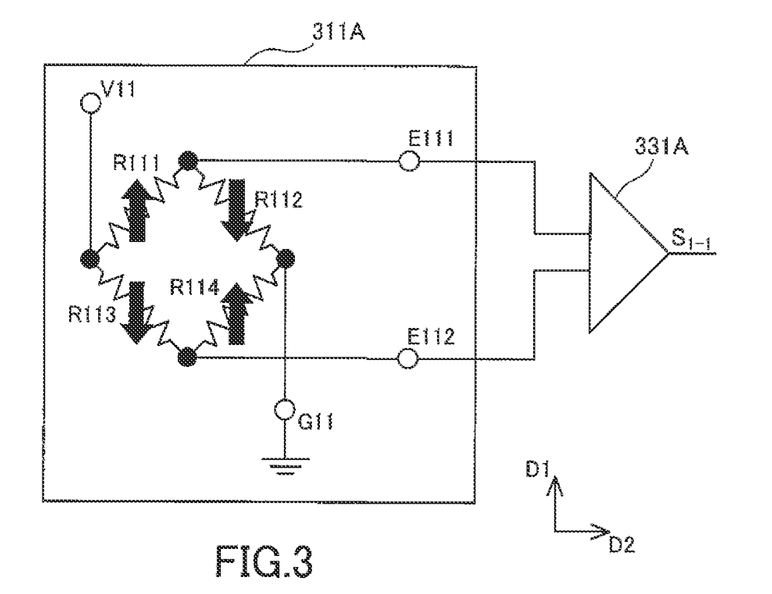
FIG. 3 is a circuit diagram that schematically shows the circuit configuration of the 1-1st Wheatstone bridge circuit in the one embodiment of the present invention.

As shown in FIG. 3, the 1-1st Wheatstone bridge circuit 311A of the first magnetic sensor part 31A includes a power supply port V11, a ground port G11, two output ports E111 and E112, a first pair of series-connected magnetic detection elements R111 and R112, and a second pair of series-connected magnetic detection elements R113 and R114. The magnetic detection elements R111 and R113 are connected to the power supply port V11 at one end. The other end of the magnetic detection element R111 is connected to one end of the magnetic detection element R112 and the output port E111. The other end of the magnetic detection element R113 is connected to one end of the magnetic detection element R114 and the output port E112. The other ends of the magnetic detection elements R112 and R114 are connected to the ground port G11. A power supply voltage of a predetermined magnitude is applied to the power supply port V11, and the ground port G11 is connected to the ground.

Figure 4:
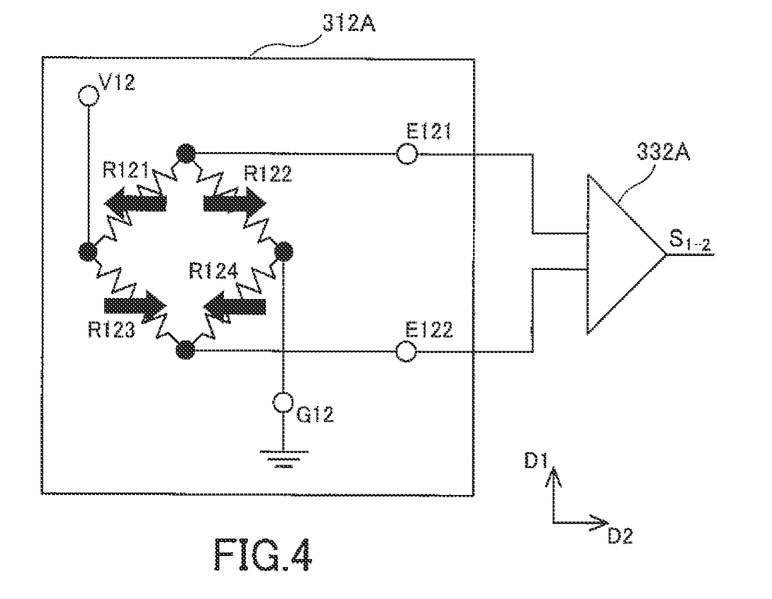
FIG. 4 is a circuit diagram that schematically shows the circuit configuration of the 1-2nd Wheatstone bridge circuit in the one embodiment of the present invention.

As shown in FIG. 4, the 1-2nd Wheatstone bridge circuit 312A of the first magnetic sensor part 31A has the same configuration as the 1-1st Wheatstone bridge circuit 311A and includes a power supply port V12, a ground port G12, two output ports E121 and E122, a first pair of series-connected magnetic detection elements R121 and R122, and a second pair of series-connected magnetic detection elements R123 and R124. The magnetic detection elements R121 and R123 are connected to the power supply port V12 at one end. The other end of the magnetic detection element R121 is connected to one end of the magnetic detection element R122 and the output port E121. The other end of the magnetic detection element R123 is connected to one end of the magnetic detection element R124 and the output port E122. The other ends of the magnetic detection elements R122 and R124 are connected to the ground port G12. A power supply voltage of a predetermined magnitude is applied to the power supply port V12, and the ground port G12 is connected to the ground.

Figure 5:
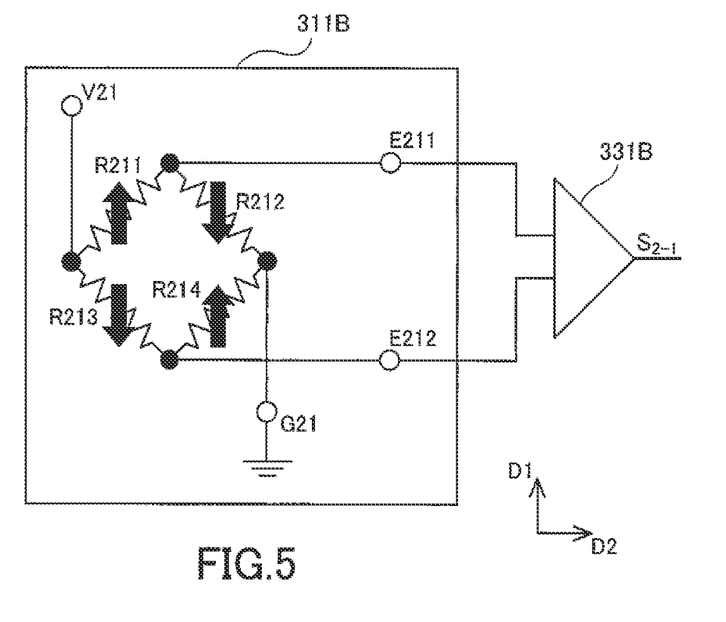
FIG. 5 is a circuit diagram that schematically shows the circuit configuration of the 2-1st Wheatstone bridge circuit in the one embodiment of the present invention

As shown in FIG. 5, the 2-1st Wheatstone bridge circuit 311B of the second magnetic sensor part 31B has the same configuration as the 1-1st Wheatstone bridge circuit 311A and includes a power supply port V21, a ground port G21, two output ports E211 and E212, a first pair of series-connected magnetic detection elements R211 and R212, and a second pair of series-connected magnetic detection elements R213 and R214. The magnetic detection elements R211 and R213 are connected to the power supply port V21 at one end. The other end of the magnetic detection element R211 is connected to one end of the magnetic detection element R212 and the output port E211. The other end of the magnetic detection element R213 is connected to one end of the magnetic detection element R214 and the output port E212. The other ends of the magnetic detection elements R212 and R214 are connected to the ground port G21. A power supply voltage of a predetermined magnitude is applied to the power supply port V21, and the ground port G21 is connected to the ground.

Figure 6:
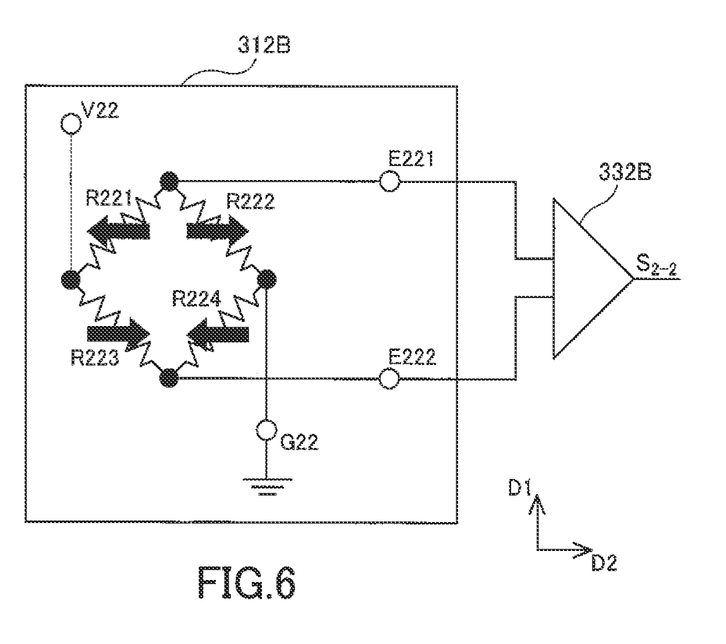
FIG. 6 is a circuit diagram that schematically shows the circuit configuration of the 2-2nd Wheatstone bridge circuit in the one embodiment of the present invention

As shown in FIG. 6, the 2-2nd Wheatstone bridge circuit 312B of the second magnetic sensor part 31B has the same configuration as the 2-1st Wheatstone bridge circuit 311B and includes a power supply port V22, a ground port G22, two output ports E221 and E222, a first pair of series-connected magnetic detection elements R221 and R222, and a second pair of series-connected magnetic detection elements R223 and R224. The magnetic detection elements R221 and R223 are connected to the power supply port V22 at one end. The other end of the magnetic detection element R221 is connected to one end of the magnetic detection element R222 and the output port E221. The other end of the magnetic detection element R223 is connected to one end of the magnetic detection element R224 and the output port E222. The other ends of the magnetic detection elements R222 and R224 are connected to the ground port G22. A power supply voltage of a predetermined magnitude is applied to the power supply port V22, and the ground port G22 is connected to the ground.

In this embodiment, it is possible to use magnetic detection elements such as MR elements including TMR elements, GMR elements, and AMR elements or Hall elements, and particularly it is preferable to use TMR elements as all magnetic detection elements R111 to R124 and R211 to R224 that are included in the 1-1st Wheatstone bridge circuit 311A, the 1-2nd Wheatstone bridge circuit 312A, the 2-1st Wheatstone bridge circuit 311B, and the 2-2nd Wheatstone bridge circuit 312B. A TMR element and a GMR element have a magnetization fixed layer in which the magnetization direction is fixed, a free layer in which the magnetization direction changes according to the direction of the applied magnetic field, and a non-magnetic layer that is arranged between the magnetization fixed layer and the free layer.

Specifically, as shown in FIG. 7, an MR element has a plurality of lower electrodes 41, a plurality of MR films 50, and a plurality of upper electrodes 42. The plurality of lower electrodes 41 is provided on a substrate (not shown). The lower electrodes 41 each have an elongated shape. A space is formed between two lower electrodes 41 adjacent to each other in the longitudinal direction of the lower electrodes 41. The MR films 50 are provided on the top surfaces of the lower electrodes 41 near both longitudinal ends. As shown in FIG. 8, an MR film 50 is nearly circular in a plan view and includes a free layer 51, a non-magnetic layer 52, a magnetization fixed later 53, ad an antiferromagnetic layer 54, which are layered in sequence from the lower electrode 41. The free layer 51 is electrically connected to the lower electrode 41. The antiferromagnetic layer 54 is configured by an antiferromagnetic material and causes exchange coupling to the magnetization fixed layer 53, thereby playing a role of fixing the magnetization direction of the magnetization fixed layer 53. The plurality of upper electrodes 42 are provided on the plurality of MR films 50. The upper electrodes 42 each have an elongated shape, are arranged on two lower electrodes 41 adjacent to each other in the longitudinal direction of the lower electrodes 41 and electrically connect the antiferromagnetic layers 54 of two adjacent MR films 50. Here, the MR films 50 may have a configuration in which the free layer 51, the non-magnetic layer 52, the magnetization fixed layer 53, and the antiferromagnetic layer 54 are layered in sequence from the upper electrode 42. Moreover, the magnetization fixed layer 53 may have a stacked Ferri structure of a ferromagnetic layer/a non-magnetic intermediate layer/a ferromagnetic layer to form a so-called self-pinned type fixed layer (a synthetic Ferri pinned layer, an SFP layer) in which the two ferromagnetic layers are antiferromagnetically coupled, whereby the antiferromagnetic layer 54 may be omitted.

In a TMR element, the non-magnetic layer 52 is a tunnel barrier layer. In a GMR element, the non-magnetic layer 52 is a non-magnetic conductive layer. In a TMR element or a GMR element, the resistance value changes according to the angle of the magnetization direction of the free layer 51 with respect to the magnetization direction of the magnetization fixed layer 53. The resistance value is minimized when this angle is 0° (their magnetization directions are parallel) and is maximized when this angle is 180° (their magnetization directions are antiparallel).

In FIGS. 3 to 6, when the magnetic detection elements R111 to R124 and R211 to R224 are TMR elements or GMR elements, the magnetization directions of their magnetization fixed layers 53 are shown by filled arrows. In the 1-1st Wheatstone bridge circuit 311A of the first magnetic sensor part 31A, the magnetization directions of the magnetization fixed layers 53 of the magnetic detection elements R111 to R114 are parallel to a first direction D1, and the magnetization directions of the magnetization fixed layers 53 of the magnetic detection elements R111 and R114 and the magnetization directions of the magnetization fixed layers 53 of the magnetic detection elements R112 and R113 are antiparallel to each other. Moreover, in the 1-2nd Wheatstone bridge circuit 312A, the magnetization directions of the magnetization fixed layers 53 of the magnetic detection elements R121 to R124 are parallel to a second direction D2 that is orthogonal to the first direction D1, and the magnetization directions of the magnetization fixed layers 53 of the magnetic detection elements R121 and R124 and the magnetization directions of the magnetization fixed layers 53 of the magnetic detection elements R122 and R123 are antiparallel to each other.

In the 2-1st Wheatstone bridge circuit 311B of the second magnetic sensor part 31B, the magnetization directions of the magnetization fixed layers 53 of the magnetic detection elements R211 to R214 are parallel to the first direction D1, and the magnetization directions of the magnetization fixed layers 53 of the magnetic detection elements R211 and R214 and the magnetization directions of the magnetization fixed layers 53 of the magnetic detection elements R212 and R213 are antiparallel to each other. Moreover, in the 2-2nd Wheatstone bridge circuit 312B, the magnetization directions of the magnetization fixed layers 53 of the magnetic detection elements R221 to R224 are parallel to the second direction D2, which is orthogonal to the first direction D1, and the magnetization directions of the magnetization fixed layers 53 of the magnetic detection elements R221 and R224 and the magnetization directions of the magnetization fixed layers 53 of the magnetic detection elements R222 and R223 are antiparallel to each other.

In the first magnetic sensor part 31A and the second magnetic sensor part 31B, the potential differences between the output ports E111, E112, E121, and E122 and the output ports E211, E212, E221, and E222 change according to change in the magnetic field direction that accompanies the rotation of the shaft 4, and a 1-1st sensor signal $S_{1-1}$, a 1-2nd sensor signal $S_{1-2}$, a 2-1st sensor signal $S_{2-1}$, and a 2-2nd sensor signal $S_{2-2}$ are output as signals that show the magnetic field intensity.

A differential detector 331A outputs the signal corresponding to the potential difference between the output ports E111 and E112 as the 1-1st sensor signal $S_{1-1}$ to the first operation part 32A and the second operation part 32B. A differential detector 332A outputs the signal corresponding to the potential difference between the output ports E121 and E122 as the 1-2nd sensor signal $S_{1-2}$ to the first operation part 32A and the second operation part 32B. A differential detector 331B outputs the signal corresponding to the potential difference between the output ports E211 and E212 as the 2-1st sensor signal $S_{2-1}$ to the first operation part 32A and the second operation part 32B. A differential detector 332B outputs the signal corresponding to the potential difference between the output ports E221 and E222 as the 2-2nd sensor signal $S_{2-2}$ to the first operation part 32A and the second operation part 32B.

As shown in FIGS. 3 and 4, the magnetization directions of the magnetization fixed layers 53 of the magnetic detection elements R111 to R114 in the 1-1st Wheatstone bridge circuit 311A and the magnetization directions of the magnetization fixed layers 53 of the magnetic detection elements R121 to R124 in the 1-2nd Wheatstone bridge circuit 312A are orthogonal to each other. In such a case, the waveform of the 1-1st sensor signal $S_{1-1}$ is a cosine waveform that depends on the rotation angle θ of the first multipolar magnet 2A. The waveform of the 1-2nd sensor signal $S_{1-2}$ is a sine waveform that depends on the rotation angle θ of the first multipolar magnet 2A. In other words, it can be said that the 1-1st sensor signal $S_{1-1}$ is a first cos signal and the 1-2nd sensor signal $S_{1-2}$ is a first sin signal.

As shown in FIGS. 5 and 6, the magnetization directions of the magnetization fixed layers 53 of the magnetic detection elements R211 to R214 in the 2-1st Wheatstone bridge circuit 311B and the magnetization directions of the magnetization fixed layers 53 of the magnetic detection elements R221 to R224 in the 2-2nd Wheatstone bridge circuit 312B are orthogonal to each other. In such a case, the waveform of the 2-1st sensor signal $S_{2-1}$ is a cosine waveform that depends on the rotation angle θ of the second multipolar magnet 2B. The waveform of the 2-2nd sensor signal $S_{2-2}$ is a sine waveform that depends on the rotation angle θ of the second multipolar magnet 2B. In other words, it can be said that the 2-1st sensor signal $S_{2-1}$ is a second cos signal and the 2-2nd sensor signal $S_{2-2}$ is a second sin signal. Here, the first multipolar magnet 2A and the second multipolar magnet 2B are different in the number of poles, whereby the first cos signal and the second cos signal are different in frequency from each other, and the first sin signal and the second sin signal are also different in frequency from each other.

The first cross-coupled operation part 321A performs a first cross-coupled operation based on the first cos signal (Cos θ$_1$) and the first sin signal (Sin θ$_1$) that are output from the first magnetic sensor part 31A and the second cos signal (Cos θ$_2$) and the second sin signal (Sin θ$_2$) that are output from the second magnetic sensor part 31B. Specifically, the first cross-coupled operation part 321A performs addition using a 1-1st signal set including the first sin signal (Sin θ$_1$) and the second cos signal (Cos θ$_2$) (Sin θ$_1$+Cos θ$_2$) and subtraction using a 1-2nd signal set including the first cos signal (Cos θ$_1$) and the second sin signal (Sin θ$_2$) (Cos θ$_1$−Sin θ$_2$). As a result, an oscillatory waveform as shown in FIG. 9 is obtained.

Figure 10:
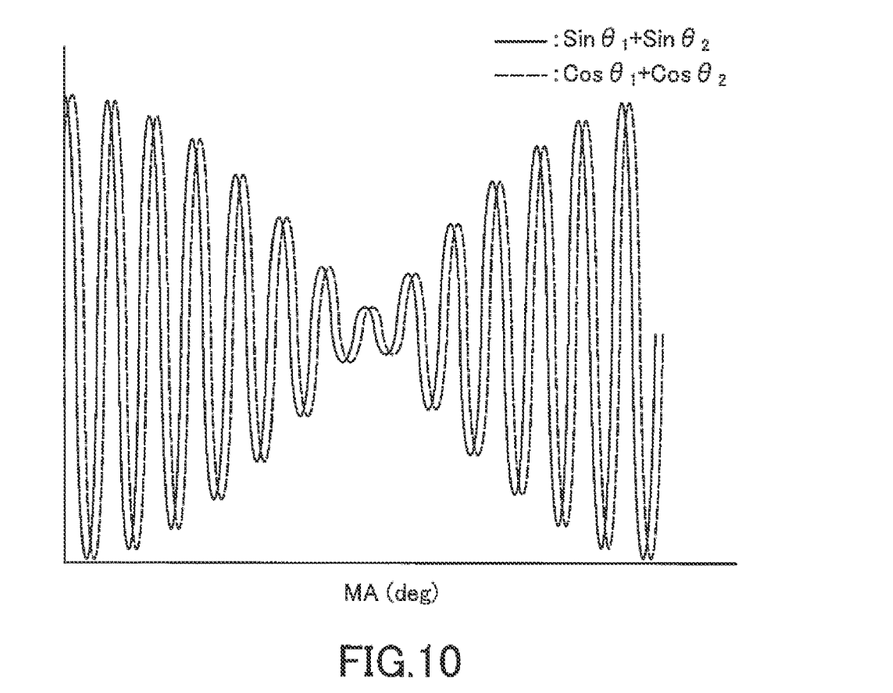
FIG. 10 is a waveform chart of signals that are generated by the second cross-coupled operation part in the one embodiment of the present invention.

The second cross-coupled operation part 321B performs a second cross-coupled operation based on the first cos signal (Cos θ$_1$) and the first sin signal (Sin θ$_1$) that are output from the first magnetic sensor part 31A and the second cos signal (Cos θ$_2$) and the second sin signal (Sin θ$_2$) that are output from the second magnetic sensor part 31B. Specifically, the first cross-coupled operation part 321A performs addition using a 1-1st signal set including the first sin signal (Sin θ$_1$) and the second sin signal (Sin θ$_2$) (Sin θ$_1$+Sin θ$_2$) and addition using a 1-2nd signal set including the first cos signal (Cos θ$_1$) and the second cos signal (Cos θ$_2$) (Cos θ$_1$+Cos θ$_2$). As a result, an oscillatory waveform as shown in FIG. 10 is obtained.

Figure 9:
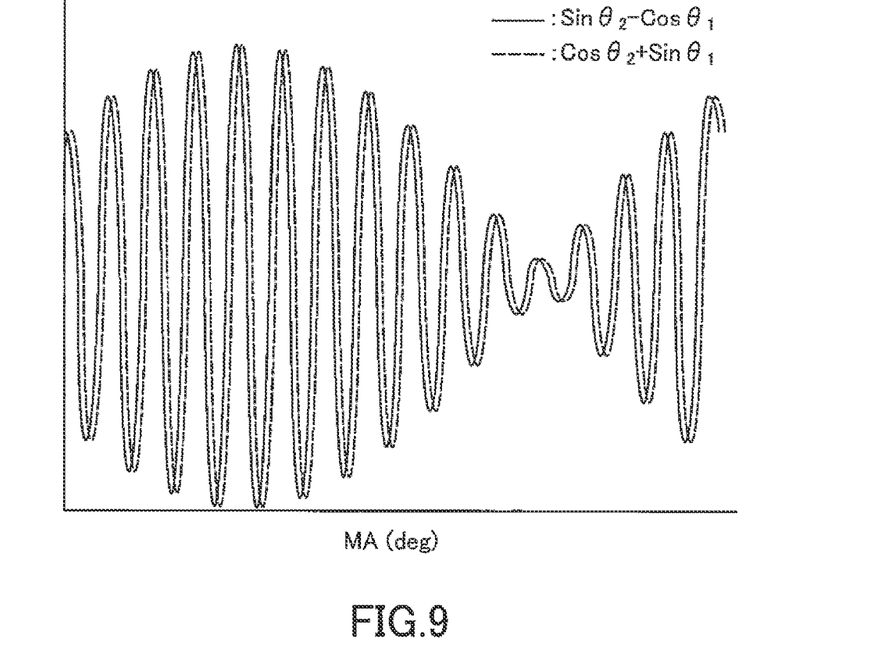
FIG. 9 is a waveform chart of signals that are generated by the first cross-coupled operation part in the one embodiment of the present invention.
Figure 11:
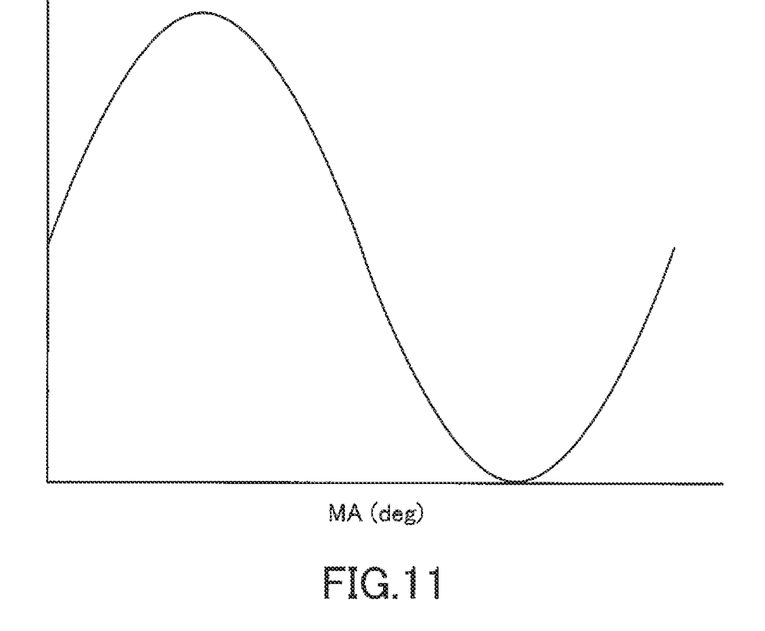
FIG. 11 is a waveform chart that shows the first Lissajous curve that is generated by the first Lissajous curve generation part in the one embodiment of the present invention.
Figure 12:
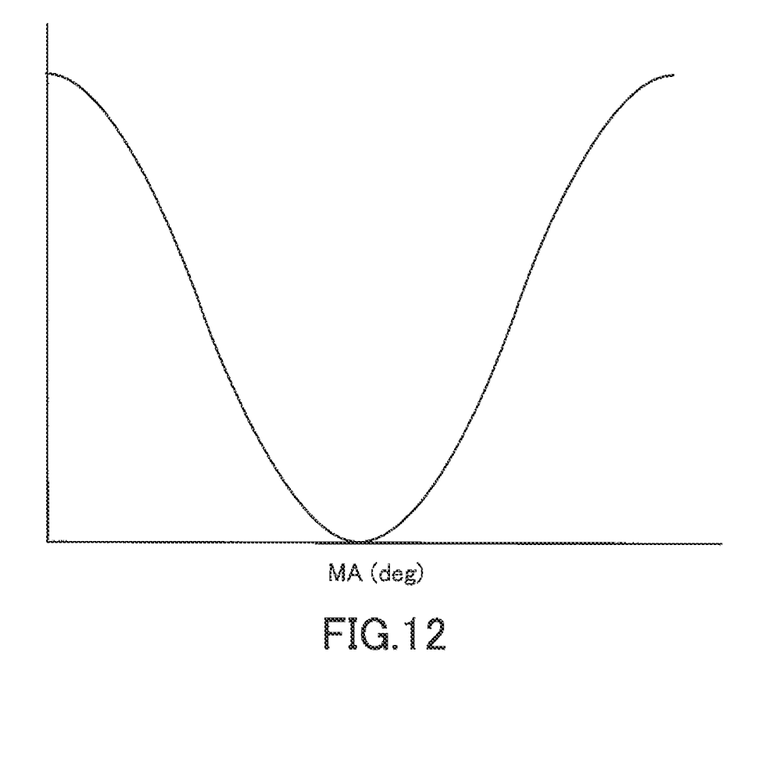
FIG. 12 is a waveform chart that shows the second Lissajous curve that is generated by the second Lissajous curve generation part in the one embodiment of the present invention.

The first Lissajous curve generation part 322A generates a first Lissajous curve (see FIG. 11) based on a first signal Sa1 that has the oscillatory waveform that is obtained in the first cross-coupled operation by the first cross-coupled operation part 321A (see FIG. 9). The second Lissajous curve generation part 322B generates a second Lissajous curve (see FIG. 12) based on a second signal $S_{A2}$ that has the oscillatory waveform that is obtained in the second cross-coupled operation by the second cross-coupled operation part 321B (see FIG. 10). As just stated, the first Lissajous curve that is presented as a single-cycle sine wave (see FIG. 11) and the second Lissajous curve that is presented as a single-cycle cosine wave (see FIG. 12) can be generated by the first Lissajous curve generation part 322A and the second Lissajous curve generation part 322B. The first Lissajous curve and the second Lissajous curve need only be curves of which the cycles are shifted. How much their cycles are shifted is not particularly restricted, and it is sufficient to be shifted substantially by a π/2 cycle.

The operation processing part 3C performs an operation based on a signal S1 that is presented by the first Lissajous curve (see FIG. 11) and a signal S2 that is presented by the second Lissajous curve (see FIG. 12) that are generated by the first Lissajous curve generation part 322A and the second Lissajous curve generation part 322B to calculate the rotation angle θ of the shaft 4. The rotation angle θ of the shaft 4 that is calculated by the operation processing part 3C is stored in a storage (not shown) that is included in the operation processing part 3C. The operation processing part 3C is configured by, for example, a microcomputer, an ASIC (Application Specific Integrated Circuit), or the like. Here, the operation processing part 3C, the first operation part 32A, and the second operation part 32B may be configured by a single microcomputer, ASIC (Application Specific Integrated Circuit), or the like. The rotation angle θ of the shaft 4 can be calculated by, for example, calculating the arctangent as shown by the formula below.

$$θ=\text{atan}(S1/S2)$$

Here, as the solution to the rotation angle θ, the above formula yields two different values within 360°, which are different by 180°. However, it is possible to determine which of the two solutions of the above formula is the true value of the rotation angle θ using combinations of positive and negative signals S1 and S2. In other words, the rotation angle θ is larger than 0° and smaller than 180° when the signal S1 has a positive value. The rotation angle θ is larger than 180° and smaller than 360° when the signal S1 has a negative value. The rotation angle θ is equal to or larger than 0° and smaller than 90° or larger than 270° and equal to or smaller than 360° when the signal S2 has a positive value. The rotation angle θ is larger than 90° and smaller than 270° when the signal S2 has a negative value. The operation processing part 3C calculates the rotation angle θ within 360° using the above formula and determination on the combinations of positive/negative signals S1 and S2.

In the rotation angle detection apparatus 1 having the above configuration, as the first multipolar magnet 2A and the second multipolar magnet 2B rotate in association with rotation of the shaft 4, the magnetic fields of the first multipolar magnet 2A and the second multipolar magnet 2B change. The resistance values of the magnetic detection elements R111 to R124 and R211 to R224 of the first magnetic sensor part 31A and second magnetic sensor part 31B change according to the change in the magnetic fields, whereby a first cos signal (Cos θ$_1$) and a first sin signal (Sin θ$_1$), and a second cos signal (Cos θ$_2$) and a second sin signal (Sin θ$_2$) are output according to the potential differences between the output ports E111, E112, E121, E122, E211, E212, E221, E222. Then, the first cross-coupled operation part 321A and the second cross-coupled operation part 321B perform the first cross-coupled operation and the second cross-coupled operation, respectively, and the first Lissajous curve generation part 322A and the second Lissajous curve generation part 322B generate a first Lissajous curve and a second Lissajous curve that are expressed by a single-cycle of sine wave and cosine wave, respectively. Subsequently, the operation processing part 3C calculates the rotation angle θ of the shaft 4.

As described above, the rotation angle detection apparatus 1 according to this embodiment can calculate the rotation angle θ by a single arctangent (atan) operation processing by the operation processing part 3C, whereby there is no need to increase the circuit scale of the operation processing circuit, and it is possible to reduce the power consumption of the rotation angle detection apparatus 1. Moreover, the arctangent (atan) operation processing that requires a high clock count need only be performed one time, whereby the rotation angle θ can be calculated in a short time.

Figure 13:
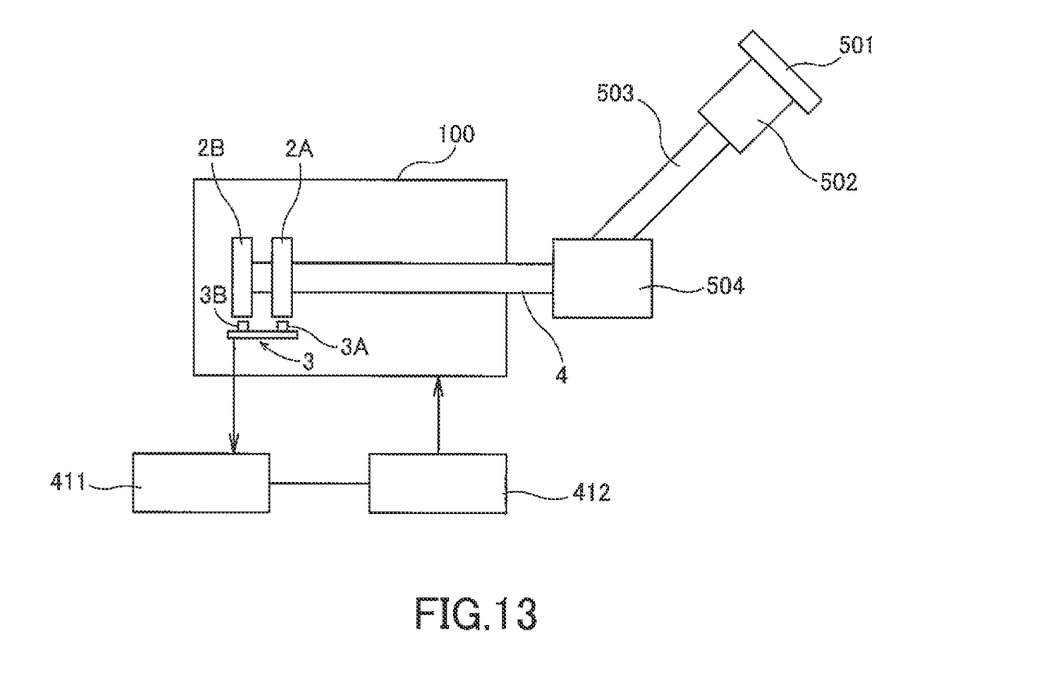
FIG. 13 is a schematic diagram that shows the configuration of the steering apparatus comprising the rotation angle detection apparatus according to the one embodiment of the present invention.

Next, the configuration of an electric power-assisted steering apparatus using the rotation angle detection apparatus according to this embodiment will be described. FIG. 13 is a schematic configuration diagram of an electric power-assisted steering apparatus using the rotation angle detection apparatus according to this embodiment.

In an electric power-assisted steering apparatus, a steering shaft 503 that is mechanically coupled to a steering wheel 501 moves in association with the shaft 4 via a coupling part 504 that is configured by gears and the like. The shaft 4 is the rotation axis RA of a motor 100, at one end of which the rotation angle detection apparatus 1 that includes the first multipolar magnet 2A, the second multipolar magnet 2B, and the magnetic detection apparatus 3 (the first magnetic detection apparatus 3A, the second magnetic detection apparatus 3B, and the operation processing part 3C) is provided. The rotation angle detection apparatus 1 calculates the rotation angle θ of the shaft 4 and sends it to an ECU 411. The ECU 411 calculates a proper motor drive amount from a signal from a torque sensor (not shown) that is installed in a steering column 502 and a signal regarding the rotation angle θ from the rotation angle detection apparatus 1 and sends a signal to a motor drive part 412. As a result, the motor 100 assists in movement of the steering shaft 503 via the shaft 4.

A system is set at the angle origin (the system origin) as a system of the electric power-assisted steering apparatus, and the rotation angle θr0 of the shaft 4 in that state is read. Specifically, with the steering wheel 501 set at a proper position, a magnetic field angle θm is obtained by the rotation angle detection apparatus 1 and the magnetic field angle θm0 corresponding to the system origin is stored in the ECU 411 of the electric power-assisted steering apparatus.

Even if the rotation angle detection apparatus 1 is installed with an assembly error, the magnetic field angle θm0 corresponding to the system origin is stored in the ECU 411, whereby it is possible to compensate for the error.

Information necessary for the system of the electric power-assisted steering apparatus or the like is the system angle θsys, namely, the rotation angle of the steering wheel 501. According to this embodiment, it is possible to obtain the system angle θsys with accuracy from the magnetic field angle θm that is obtained from output signals from the rotation angle detection apparatus 1.

The above-described embodiment is given for easy understanding of the present invention and not intended for restricting the present invention. Therefore, the elements that are disclosed in the above embodiment are intended to include any design change or equivalent that pertains to the technical scope of the present invention.

LEGEND

1 . . . Rotation angle detection device
2A . . . First multipolar magnet
2B . . . Second multipolar magnet
3 . . . Magnetic detection apparatus
3A . . . First Magnetic detection apparatus
3B . . . Second Magnetic detection apparatus
3C . . . Operation processing part
31A . . . First magnetic sensor part
31B . . . Second magnetic sensor part
32A . . . First operation part
32B . . . Second operation part
321A . . . First cross-coupled operation part
321B . . . Second cross-coupled operation part
322A . . . First Lissajous curve generation part
322B . . . Second Lissajous curve generation part

The invention claimed is:

1. An operation processing apparatus that calculates a physical quantity based on a first output signal that is output from a first sensor element and a second output signal that is output from a second sensor element, wherein
the first output signal has a different signal frequency from the second output signal,
the first output signal includes a first sine signal and a first cosine signal,
the second output signal includes a second sine signal that is different in frequency from the first sine signal and a second cosine signal that is different in frequency from the first cosine signal, and
the operation processing apparatus comprises:
a first cross-coupled operation part;
a second cross-coupled operation part;
a first Lissajous curve generation part that generates a first Lissajous curve;
a second Lissajous curve generation part that generates a second Lissajous curve; and
a physical quantity computing part that calculates the physical quantity based on the first Lissajous curve and the second Lissajous curve, wherein
the first cross-coupled operation part is configured to perform an addition process of adding the first sine signal and the second cosine signal and a subtraction process of subtracting the second sine signal from the first cosine signal to generate a first signal,
the second cross-coupled operation part is configured to perform an addition process of adding the first sine signal and the second sine signal and an addition process of adding the first cosine signal and the second cosine signal to generate a second signal,
the first Lissajous curve generation part is configured to generate the first Lissajous curve using the first signal, and
the second Lissajous curve generation part is configured to generate the second Lissajous curve using the second signal.

2. The operation processing apparatus according to claim 1, wherein
the first Lissajous curve and the second Lissajous curve are shifted from each other substantially by a π/2 cycle.

* * * * *